United States Patent [19]

Sluka

[11] 4,150,490

[45] Apr. 24, 1979

[54] RELATIVE DISPLACEMENT MEASUREMENT APPARATUS

[76] Inventor: Virgil W. Sluka, Box 24, DTS, Omaha, Nebr. 68101

[21] Appl. No.: 813,718

[22] Filed: Jul. 7, 1977

[51] Int. Cl.² ............... G01B 05/14; G01B 03/22
[52] U.S. Cl. .............................. 33/180 R; 33/1 H; 33/174 R
[58] Field of Search ............. 33/1 H, 174 R, 180 R, 33/181 R

[56] References Cited

U.S. PATENT DOCUMENTS 3,846,917  11/1974  Blakey ........................... 33/180 R

FOREIGN PATENT DOCUMENTS 972407   8/1950  France ............................. 33/181 R
48889  12/1964  Poland ............................. 33/180 R

*Primary Examiner*—Richard R. Stearns
*Attorney, Agent, or Firm*—Henderson & Sturm

[57] ABSTRACT

An apparatus is provided for the measurement of relative displacement between two surfaces, and includes an adjustable reference structure associated with the first surface, a planar guide structure having reference planes associated with the second surface, and a measurement block. A method for obtaining the measurement of the relative displacement between two surfaces is also disclosed.

8 Claims, 4 Drawing Figures

RELATIVE DISPLACEMENT MEASUREMENT APPARATUS

BACKGROUND OF THE INVENTION

In many industries it is desirable to measure the relative displacement of one body or surface to another. Possible application includes the measurement of relative displacement of adjacent monoliths or parts of structures such as: generator bays in powerplants, tunnel liner monoliths, displacement at stress cracks in structures, continuing displacement monitoring at geologic faults in underground cavities or surface foundations, monitoring alignment of machinery, and measuring strain through displacement.

The prior art reveals a number of means by which the displacement of one surface or body with respect to another surface or body may be detected or measured. For example, U.S. Pat. No. 3,842,509 discloses a strain gauge ambiguity sensor that detects variations in the planar adjustment of mirror segments through the use of a bendable mechanical element and electronic means to sense when that element is bent. This type of device is limited to areas where the relative displacement is fairly minimal, as the resistive elements acting to detect displacement can only be bent through a limited arc. The device also offers no detection means for purely lateral movement.

Polish Pat. No. 48889 discloses a feeler gauge for measuring the reciprocal shift between two block structures. The apparatus does allow measurement of the relative motion in all three planes of movement, however, as the gauge instrument is held snug in the measurement apparatus, little flexibility is afforded. Therefore, the apparatus is farily limited to situations where the relative displacement is minor.

The prior art thus reveals a common fault. The prior devices are limited to surfaces in substantial harmony with one another, and does not provide flexibility of application nor ease of operation.

There is, consequently, a need for an apparatus capable of measuring the relative displacement between two bodies in three dimensions while not limited to very small relative displacement between the bodies and easily adapted to numerous applications. The present invention is directed to that need.

BRIEF SUMMARY OF THE INVENTION

It is a primary object of this invention to provide an apparatus for the measurement of relative displacement that will easily accomodate substantial relative displacement between two surfaces and yield accurate results.

It is another object of this invention to provide an apparatus for the measurement of relative displacement that may be successfully utilized without overly complex installation and calibration techniques.

It is another object of this invention to provide an apparatus for the measurement of relative displacement that will permit multiplane measurement readings to allow a determination or relative movement within three dimensions.

Another object of this invention is to produce an apparatus for the measurement of relative displacement that uses the uniform circumference of a sphere to guarantee measuring accuracy despite odd relative displacement of the two observed surfaces.

A further object of this invention is to produce an apparatus for the measurement of relative displacement that has an adjustable point of reference that allows the point of reference to be maintained within the purview of the measuring boundaries even when the observed surfaces experience significant relative displacement.

A still further object of this invention is to provide an apparatus for the measurement of relative displacement that is inexpensive to manufacture, durable of construction, and highly effective in use.

A still further object of this invention is to provide a method for the measurement of relative displacement between surfaces.

These objects and others are realized by an apparatus and method for the measurement of the relative displacement between two surfaces which surfaces experience some movement with respect to each other. The apparatus includes an adjustable reference structure associated with a first surface, a measurement guide that provides three or more reference planes associated with a second surface, and a measuring block. A measuring instrument is used in conjunction with the apparatus to quantify the observed displacement.

Other objects, advantages and novel features of the present invention will become apparent from the following detailed description of the invention when considered in conjunction with the accompanying drawings.

BRIEF DESCRIPTION OF THE DRAWINGS

The objects heretofore set forth and others will become more readily apparent when taken upon reference to the following description, and especially when taken in conjunction with the appended drawings, described briefly as follows.

DESCRIPTION OF THE PREFERRED EMBODIMENTS

Figure 1:
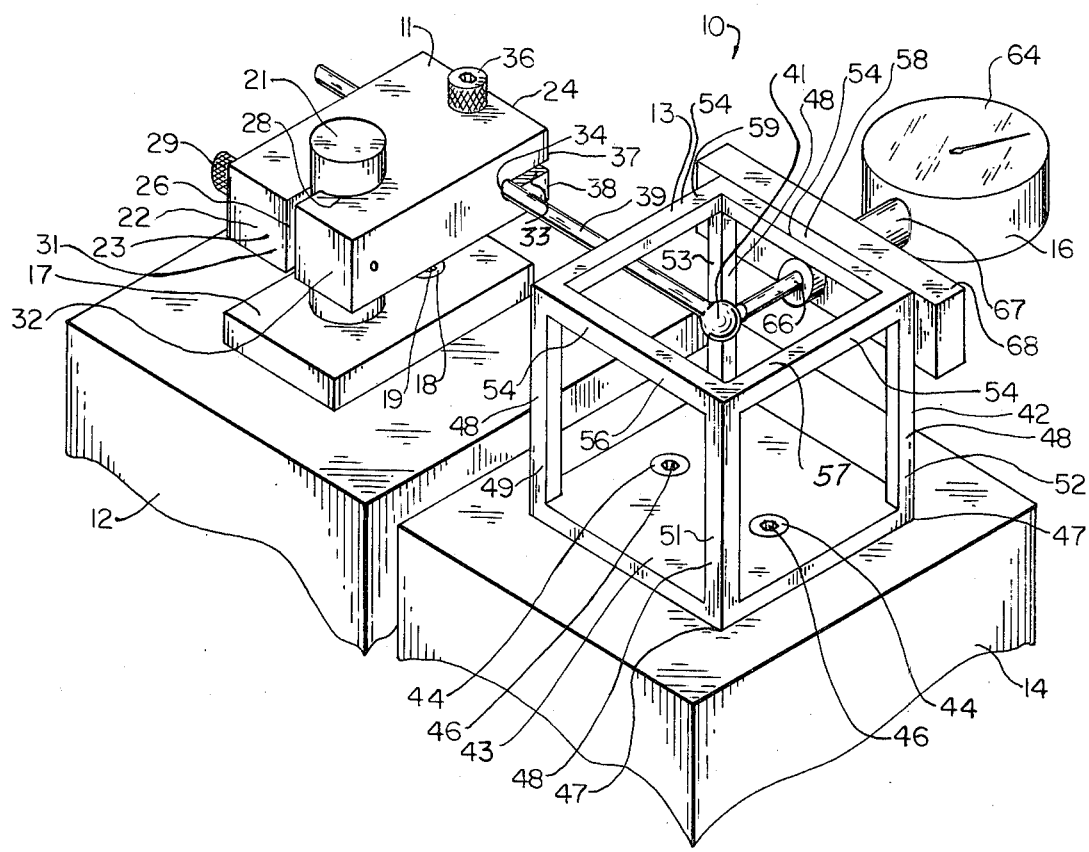
FIG. 1 is a perspective view of the apparatus in use attached to two surfaces.

Referring now to FIG. 1, the relative displacement measurement apparatus is depicted generally by the numeral 10. The apparatus includes more specifically, an adjustable reference point structure 11 associated with the displacement of a first block 12, an open frame guide structure providing planar measuring guides 13 associated with the displacement of a second block 14, and a measuring device 16.

The adjustable reference point structure 11 depicted in FIG. 1, includes a base 17 mounted to a block 12 by any suitable means. In this embodiment the base 17 is mounted by flat-head screws 18 with a hexagon shaped recess 19. Permanently affixed to the base 17 and rising vertically therefrom is a support post 21.

The adjustable reference point structure 11 further includes a reference block 22 that has a first bifurcated end 23 and a second bifurcated end 24. The first bifurcated end 23 has a vertically disposed notch 26 extending longitudinally into the reference block 22.

This notch 26 is connected to a vertically disposed cylindrical hole 28 in the reference block 22, and through which hole 28 the support post 21 is vertically disposed. A latitudinally disposed tightening screw 29 is provided so as to be threadably connected to the two flanges 31 and 32 formed by the notch 26. When this screw 29 is turned so as to cause the two flanges 31 and 32 to draw closer to each other, the result is a tightening of the first bifurcated end 23 about the support post 21, causing the reference block 22 to be vertically and horizontally supported thereby.

The second bifurcated end 24 (FIGS. 1 and 2) has a latitudinally disposed notch 33 extending longitudinally into the reference block 22. This latitudinally disposed notch 33 is connected to a latitudinally disposed cylindrical hole 34 in the reference block 22. A vertically disposed tightening screw 36 is provided so as to be threadably connected to the two flanges 37 and 38 formed by the notch 33. A reference rod 39 is inserted horizontally through the hole 34, and the screw 36 is turned so as to cause the two flanges 37 and 38 to draw together and thereby support and affix the reference rod 39 in a horizontal plane.

Figure 2:
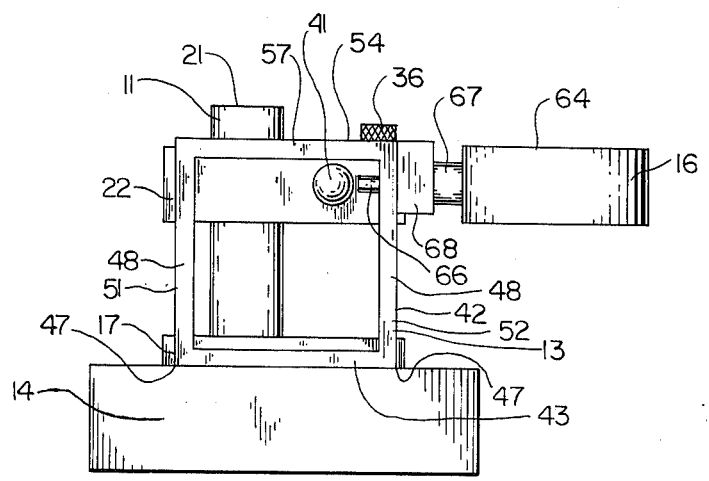
FIG. 2 is a right side orthogonal view thereof.
Figure 3:
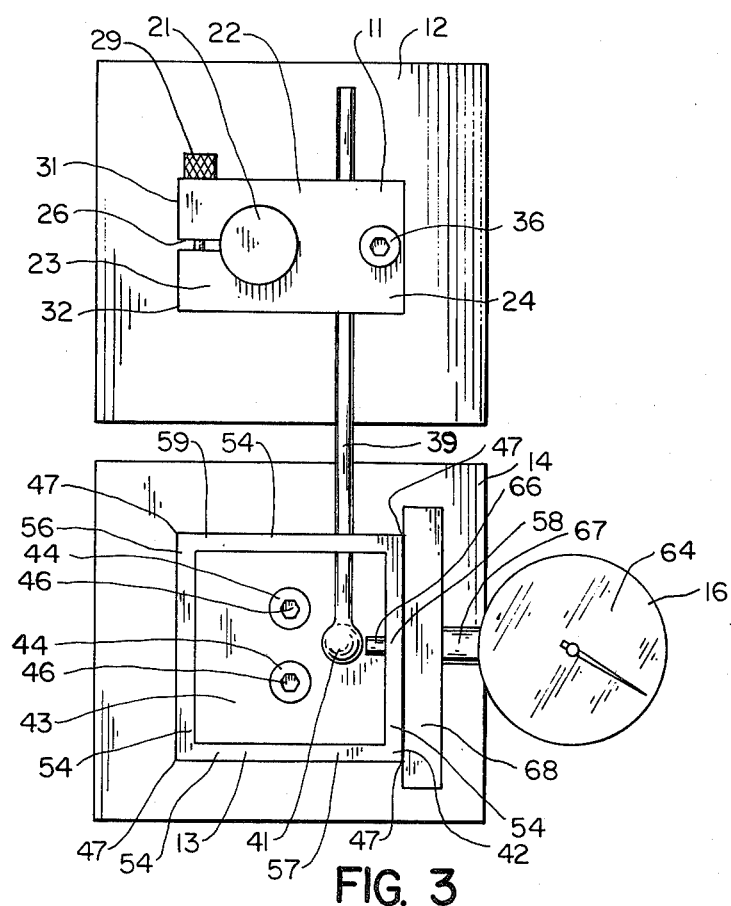
FIG. 3 is a top plan view thereof.

As shown in FIGS. 1, 2 and 3, a sphere 41 is attached to one end of the reference rod 39, which sphere serves as the reference point for relative displacement measurements.

The planar measuring guides 13 are provided by an open frame guide structure 42. This frame 42 includes a base plate 43 that is attached to a block 14 by two flathead screws 44 with a hexagon shaped recess 46. Affixed at each of the four corners 47 of the base plate 43 and arising vertically therefrom are four struts 48 depicted by the numerals 49, 51, 52 and 53. These struts 48 are horizontally interconnected by four cross members 54, depicted by the numerals 56, 57, 58 and 59, such that the two struts denoted by the numerals 49 and 51 are connected by cross member 56, struts 51 and 52 are connected by cross member 57, struts 52 and 53 are connected by cross member 58, and the final two struts 53 and 49 are connected by the final cross member 59. The cross members 54 so connected form a rectangular plane parallel to the plane defined by the base plate 43 and separated therefrom by a distance equal to the length of each strut 48.

Referring now to FIGS. 2 and 3, the measuring device 16 is a device well known by anyone skilled in this art, wherein the gauge 64 registers the extent to which the measuring shaft 66 is impressed into the tubular cavity formed by shaft 67. In the embodiment shown, a measurement block 68 is attached to the shaft 67. This measurement block 68 may be held flush against any two of the struts 48 or cross members 54 and the measuring shaft 66 will thereafter penetrate the plane formed thereby at a perpendicular status.

The operation of the invention 10 may now be disclosed as follows. The two blocks 12 and 14 represent two surfaces which are experiencing some movement relative to each other. Such a situation may exist where a building is settling or a bridge is expanding.

The adjustable reference point structure 11 is mounted to one block 12 and the planar measuring guides 13 are mounted to the other block 14. The reference block 24 supporting the reference rod 39 is adjusted in height and angle by the use of the screw 29 to place the reference rod 39 at a suitable angle with respect to the planar measuring guides 13. The other screw 36 is then used to adjust the extent to which the reference rod 39 extends within the cube-like structure 42. The ideal initial setting occurs when the sphere 41 is located at the center of the open frame guide 42, but this is not especially critical.

The measuring device 16 may then be used to determine the initial distance of the sphere from each of the three reference planes. It should be noted that reading may also be taken from the planes opposite and parallel to the aforementioned planes. This may be a useful technique where the reach of the measuring device 16 is limited.

Subsequent readings are taken in the identical manner, and the difference between the readings may be compared to calculate the relative motion between the two surfaces 12 and 14.

Figure 4:
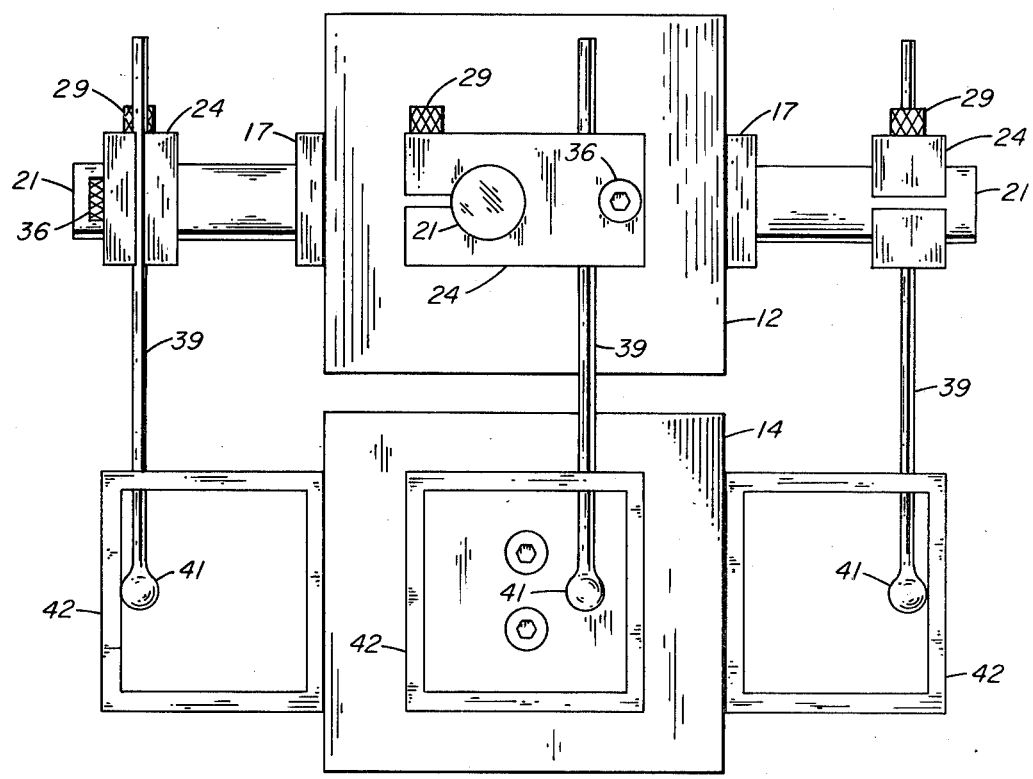
FIG. 4 is a top plan view of one apparatus and a right side view of another apparatus and a left side view of a third apparatus all three apparatus' shown without the measuring block or measuring means attached and depicting in use a plurality of displacement monitors for detecting arcuate movement between two surfaces.

If the two surfaces under observation are of the type to experience radial displacement with respect to the loci defined by the spherical reference point 41 (that is, if the two surfaces tend to move such that the sphere 41 remains stationary, as if it were the center of arcuate movement), a second apparatus 10 may be located proximate to the two surfaces in a fashion identical to the first apparatus 10. This arrangement will detect all movement except that which may serve to rotate about the axis formed by the two spheres. If it is necessary to detect such axial rotation, a third apparatus 10 as shown in FIG. 4 may be attached to the two structures, such that the three spheres are not aligned colinearly. Such an arrangement will allow the detection of all relative displacement including radial and axial.

The use of a sphere 41 in this embodiment for the reference point is important in that regardless of the direction of the relative motion between the two surfaces 12 and 14, a true reading may be obtained by the measuring device 16, since the reference surface of the sphere 41 will always be the point of tangency to the measuring surface of the measuring shaft 66. Regardless of how a sphere is turned, the circumferential point of tangency will remain true and accuracy will be served. Nevertheless, other shapes of reference structures could be satisfactorily utilized within this invention.

It should be obvious that a substantial degree of motion between the two blocks 12 and 14 may be accomodated, as compared with the prior art. The sphere 41 is allowed the full interior of the cube-like structure in which to move. The "open" design of the frame guide 42 allows measurements to be taken almost regardless of where the sphere 41 is located within the cube 42. Furthermore, should the blocks 12 and 14 experience motion sufficient to withdraw the sphere 41 from within the measuring purview, the reference shaft 39 and the reference block 22 may be readjusted to new locations to properly place the sphere 41, without uprooting the mounting devices.

Obviously, many modifications and variations of the present invention are possible in light of the above teachings. It is therefore to be understood that, within the scope of the appended claims, the invention may be practiced otherwise than as specifically described.

I claim:

1. A relative displacement measurement apparatus in which a measuring means having means defining a planar surface and a measuring axis substantially perpendicular thereto is utilized for measuring the relative displacement between two surfaces, the apparatus comprising:
    (a) an open frame guide structure secured to one of the surfaces for establishing reference planes with said frame guide structure having sides open so as to permit the positioning of a reference projection structure through said sides and into the interior of the frame guide structure and so as to allow movement of said measuring means parallel to each of said reference planes to permit alignment of the axis of said measurement means with said reference projection structure; and (b) a reference projection structure secured to the other surface and having a substantially spheroid reference projection disposed within said open frame guide structure, whereby said reference projection is measurably disposed proximate said reference planes.

2. A relative measurement displacement apparatus as described in claim 1 further comprising a measurement block having at least one substantially planar surface removably positioned proximal the open frame guide structure said measurement block having an opening to permit the insertion of a measuring means therethrough and wherein said measurement block's planar surface is aligned co-planar with at least one of said reference planes of said open frame guide structure.

3. A relative displacement measurement apparatus as described in claim 2 wherein said reference projection structure further comprises adjustable positioning means for adjustably positioning said reference projection structure in measureable proximity to said open frame guide structure.

4. The relative displacement measurement apparatus as described in claim 2 wherein the open frame guide structure includes:
(a) a horizontally disposed base plate; and
(b) a guide frame affixed to said base plate, said guide frame comprised of four elongated vertical members and four elongated horizontal members, wherein said vertical members and said horizontal members are affixed to each other to define a first pair of vertically parallel planes, a second pair of vertically parallel planes, and a pair of horizontal planes, wherein said first pair of planes is disposed perpendicularly to said second pair of planes and to said pair of horizontal planes, and wherein said second pair of planes is disposed perpendicularly to said pair of horizontal planes.

5. The relative displacement measurement apparatus as described in claim 4 wherein said measurement block is comprised of a hexahedron having an aperature adapted to the insertion of a measurement instrument.

6. A method for measuring the relative displacement between surfaces comprising:
(a) attaching an open frame guide structure for establishing reference planes to a first surface wherein said frame guide structure includes sides open so as to permit the positioning of a reference projection structure through said sides and into the interior of the frame guide structure so as to allow movement of a measurement means having means defining a planar surface and a measuring axis substantially perpendicular thereto parallel to said reference planes to permit alignment of the axis of said measurement means with said reference structure; and (b) attaching to a second surface a reference projection structure for establishing a measuring reference projection wherein said reference projection structure includes a substantially spheroid reference projection;

(c) positioning said measuring reference projection structure within said open frame guide structure so that the substantially spheroid reference projection is measurably disposed within the open frame guide structure.

7. A method for measuring the relative displacement between surfaces as described in claim 6 wherein a plurality of open frame guide structures and a similar plurality of spheroid reference projection structures are utilized at different points between the surfaces so as to further detect arcuate displacement between the surfaces.

8. A relative displacement measurement apparatus in which a measurement means having means defining a planar surface and a measuring axis substantially perpendicular thereto is utilized for measuring the relative displacement between two surfaces, the apparatus comprising:

(a) an open frame guide structure secured to one of the surfaces for establishing reference planes with said frame guide structure having sides open so as to permit the positioning of a reference projection structure through said sides and into the interior of the frame guide structure so as to allow movement of said measurement means parallel to said reference planes to permit alignment of the axis of said measurement means with said reference projection structure; and (b) a reference projection structure secured to the other surface wherein said reference projection structure includes a horizontally disposed base plate; a vertical support post affixed to said base plate; a reference block adjustably affixed to said support post; and a reference rod adjustably affixed to said reference block, said reference rod having a tip end and a butt end, wherein said butt end of said reference rod is adjustably affixed to said reference block and said tip end of said reference rod is substantially spheroid wherein said tip end of said reference rod is disposed within the open frame guide structure.

* * * * *